(12) United States Patent
Kato

(10) Patent No.: US 7,792,399 B2
(45) Date of Patent: Sep. 7, 2010

(54) OPTICAL DEVICE

(75) Inventor: Yoshichika Kato, Tokyo (JP)

(73) Assignee: Japan Aviation Electronics Industry Limited, Tokyo (JP)

( * ) Notice: Subject to any disclaimer, the term of this patent is extended or adjusted under 35 U.S.C. 154(b) by 0 days.

(21) Appl. No.: 12/356,334

(22) Filed: Jan. 20, 2009

(65) Prior Publication Data

US 2009/0185776 A1 Jul. 23, 2009

(30) Foreign Application Priority Data

Jan. 21, 2008 (JP) .............................. 2008-010685

(51) Int. Cl.
*G02B 6/26* (2006.01)
(52) U.S. Cl. ...................................................... 385/18
(58) Field of Classification Search ................. None
See application file for complete search history.

(56) References Cited

U.S. PATENT DOCUMENTS

| | | | |
|---|---|---|---|
| 5,479,546 A | 12/1995 | Dumais et al. | |
| 6,002,514 A * | 12/1999 | Barrett et al. | 359/302 |
| 6,212,307 B1 * | 4/2001 | Labeye et al. | 385/14 |
| 6,298,178 B1 * | 10/2001 | Day et al. | 385/14 |
| 6,912,345 B2 | 6/2005 | Dautartas et al. | |
| 6,931,178 B2 | 8/2005 | Saccomanno | |
| 7,039,268 B2 | 5/2006 | Yoshida et al. | |
| 2003/0202750 A1 * | 10/2003 | Okada et al. | 385/49 |
| 2004/0020896 A1 | 2/2004 | Dasgupta et al. | |
| 2005/0105842 A1 * | 5/2005 | Vonsovici et al. | 385/14 |
| 2007/0189660 A1 * | 8/2007 | Sugimoto | 385/14 |

FOREIGN PATENT DOCUMENTS

| | | |
|---|---|---|
| CN | 2876807 Y | 3/2007 |
| JP | 62-052510 | 3/1987 |
| JP | 08-160259 | 6/1996 |
| JP | 08-234061 | 9/1996 |
| JP | 09-304666 | 11/1997 |
| JP | 2001-330755 | 11/2001 |
| JP | 2004-012647 | 1/2004 |
| JP | 2005-37885 | 2/2005 |
| JP | 2005-164886 | 6/2005 |

(Continued)

OTHER PUBLICATIONS

First Office Action for counterpart Chinese patent application No. 2009-10001644.1 dated Feb. 5, 2010.
First Office Action for counterpart Japanese patent application No. 2008-010685 dated Feb. 9, 2010.

*Primary Examiner*—Sung H Pak
(74) *Attorney, Agent, or Firm*—David N. Lathrop

(57) ABSTRACT

The present invention seeks to realize an optical device that is capable of preventing stray light from entering light input and output means such as optical fibers and that excels in return loss characteristics. The optical device has a free space at least having a wall surface at part thereof, one or more light output means that outputs a light beam toward the free space and one or more light input means that inputs the light beam arriving through the free space. The optical device further includes an antireflective means such as a terminal waveguide provided at either part of the wall surface to prevent unwanted light irradiated to that part of the wall surface from being reflected to the free space.

10 Claims, 14 Drawing Sheets

FOREIGN PATENT DOCUMENTS

| | | |
|---|---|---|
| JP | 2004-325999 | 11/2005 |
| JP | 2007-057859 | 3/2007 |
| JP | 2007-114230 | 5/2007 |
| JP | 2007-322976 | 12/2007 |

* cited by examiner

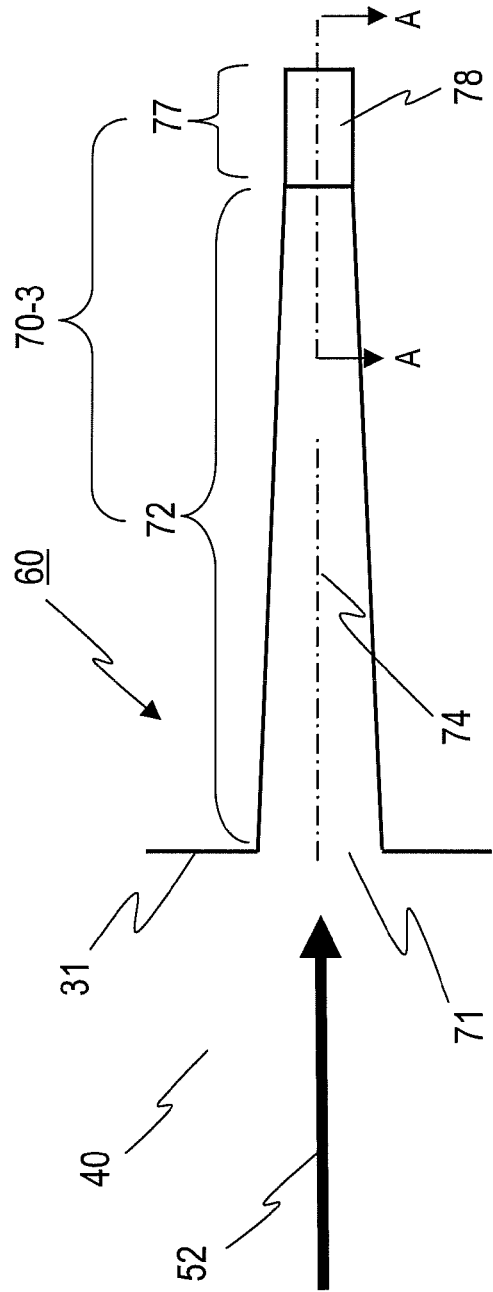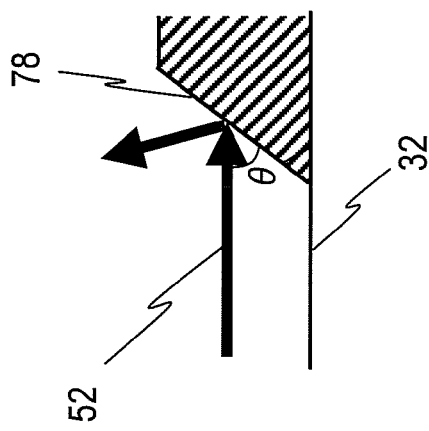
FIG.4A
FIG.4B

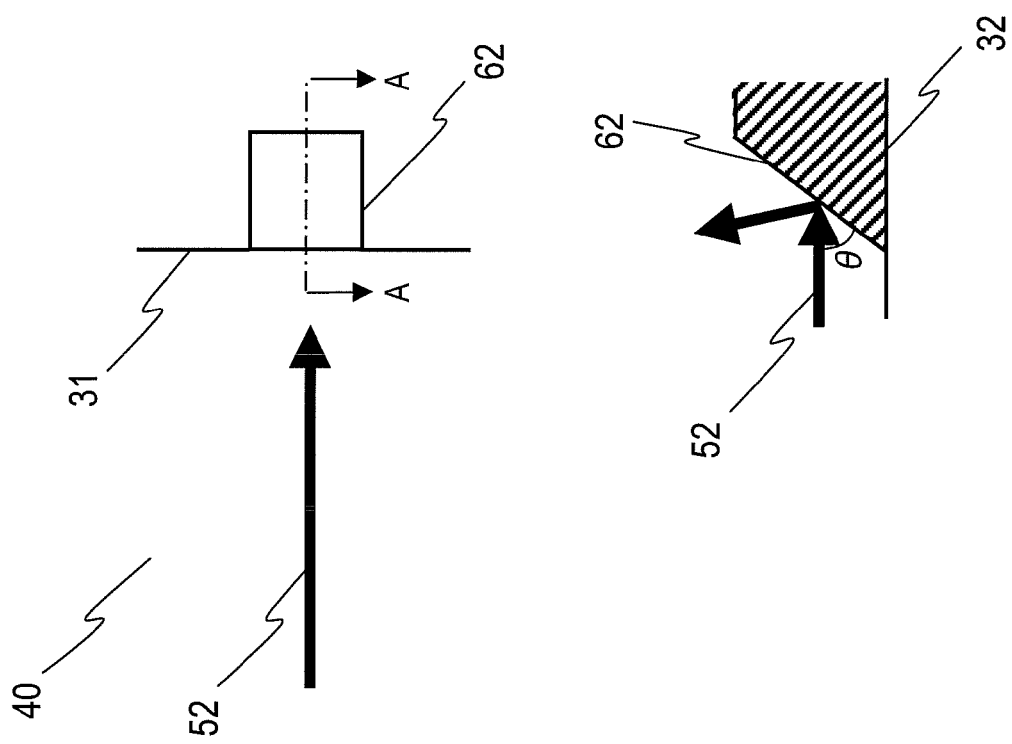

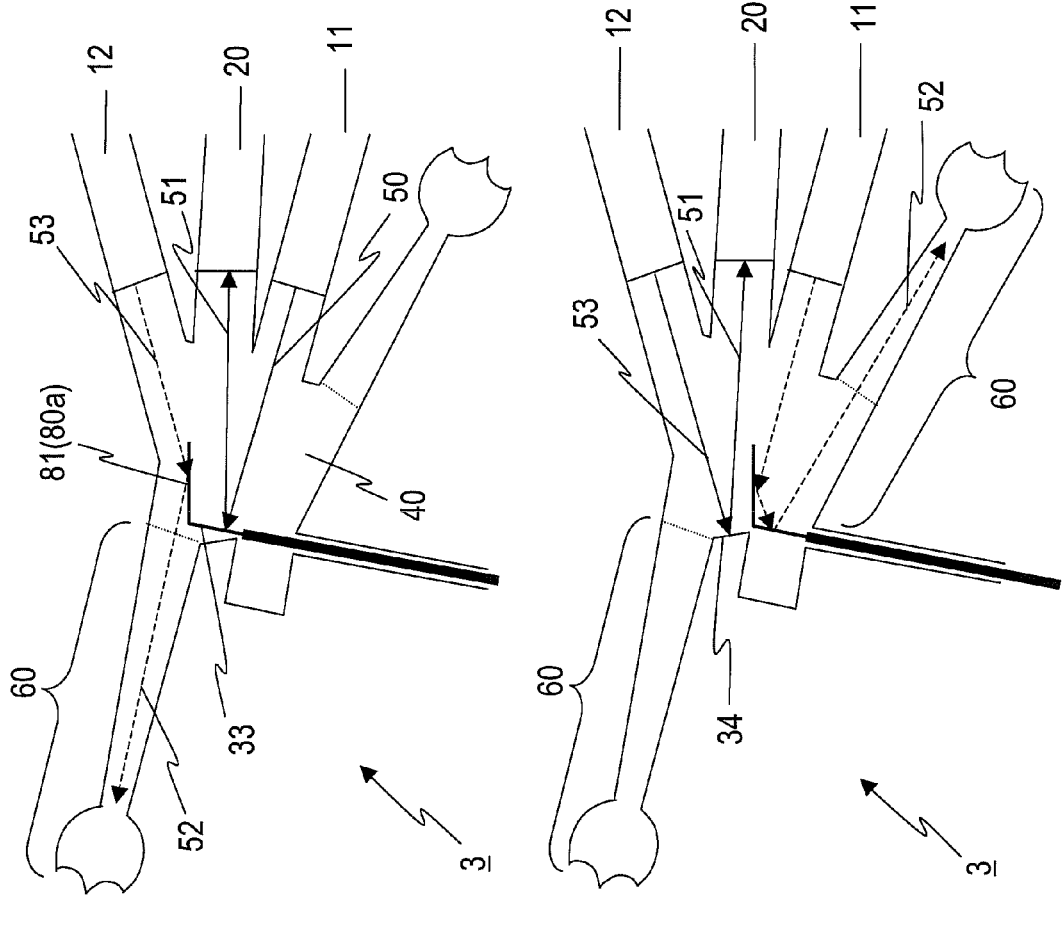

OPTICAL DEVICE

BACKGROUND OF THE INVENTION

1. Field of the Invention

The present invention relates to an optical device having one or more light emitting means and one or more light inputting means optically connected with each other and more specifically to a technology for preventing stray light from being generated within the optical device.

2. Related Background Art

An optical device of this sort is fabricated by using a silicon substrate for example as its substrate and by forming necessary elements on the substrate by way of etching and others. Optical waveguide means such as an optical fiber is then provided on the substrate. Japanese Patent Application Laid-Open No. 2005-37885 (referred to as JP2005-37885A hereinafter) and Japanese Patent Application Laid-Open No. 2005-164886 (referred to as JP2005-164886A hereinafter) disclose exemplary optical devices as described above.

The optical device shown in FIGS. 1 through 3 of JP2005-37885A is a 2×2-type optical switch. This optical device is provided with four grooves in which optical fibers are installed in such a manner that they intersect from each other on the substrate. A movable mirror provided at a tip of a movable rod is disposed movably in the intersection where those four grooves intersect. The movable rod is supported movably by four hinges and is driven by a comb-type electrostatic actuator. The movable mirror is inserted into or is pulled out of the intersection in accordance to the move of the movable rod. The movable mirror switches optical paths (optical connecting) among the optical fibers provided respectively in the four grooves by being inserted into and pulled out of the intersection.

JP2005-164886A also discloses a 2×2-type optical switch similar to one in JP2005-37885A in FIGS. 14 and 15. This optical device is also provided with optical fibers installed respectively in four grooves formed in a cross shape on a substrate. Then, a movable mirror switches optical paths by being inserted into or pulled out of an intersection of those four grooves.

It is noted that the tip of the optical fiber is ground aslant with respect to an optical axis thereof (inclined end face is formed) in the both optical devices described in JP2005-37885A and JP2005-164886A. The inclined end face increases a return loss at a optical fiber end face and prevents influences on a light source and deterioration of signal quality.

SUMMARY OF THE INVENTION

The space into which the mirror of the optical device is inserted or pulled out as described in JP2005-37885A and JP2005-164886A is the intersection of the four grooves for installing the optical fibers. That is, this space is a space surrounded by the tip end faces of the optical fibers and sidewall surfaces of the substrate perpendicular to a plane of the substrate. The optical fibers are provided such that optical axes thereof run in parallel with the plane of the substrate. Still more, the inclined end face at the tip of the optical fiber is perpendicular to the plane of the substrate. Accordingly, an optical axis of an output light beam outputted out of the tip end face of the optical fiber exists within a plain surface that is parallel with the plane of the substrate.

When a light beam is outputted out of one optical fiber to the space within such optical device, light that is not coupled with the other optical fiber, i.e., light that is reflected by some interface existing within the optical path such as a surface of a device such as the mirror and an optical filter provided within the optical path and the end face of the other optical fiber in particular, is reflected by the plane perpendicular to the plane of the substrate surrounding the space and repeats reflection within one plain surface parallel with the plane of the substrate. The light is then finally fed back to and coupled with the original optical fiber. Therefore, it becomes unable to obtain a fully large return loss.

The deterioration of the return loss characteristics caused by stray light is a serious problem when the mirror surface perpendicular to the plane of the substrate exists within the space where light propagates like the optical device described in JP2005-37885A and JP2005-37886A because reflectivity of the mirror surface is high.

Consider now a case of constructing an optical device provided with a mirror surface within a space where light propagates as a MEMS (Micro Electro Mechanical System) for example. In this case, a metallic film (reflecting film) is formed on a surface of a mirror base by using a mechanical mask by way of sputtering and others. However, it is difficult to form the film strictly only on the surface where the mirror surface should be formed and normally, the film is formed also around the surface. Accordingly, the metallic film is formed also on a sidewall and others of a space where the mirror surface is positioned. The deterioration of the return loss characteristics becomes even more serious in such a case.

Accordingly, the present invention seeks to realize an optical device that is capable of preventing stray light from entering light outputting/inputting means such as an optical fiber and that excels in the return loss characteristics.

An optical device of the invention has a free space having a wall surface at least partly, one or more light output means that outputs a light beam toward the free space and one or more light input means that inputs the light beam arriving through the free space. The optical device is further provided with an antireflective means, formed some part of the wall surface, to prevent the optical beam irradiated thereto from being reflected to the free space.

The invention allows stray light to be removed by guiding it out of the device or by absorbing it, so that it is possible to prevent the stray light from entering the light output/input means such as optical fibers and to realize the optical device that excels in the return loss characteristics and in reduction of optical noises.

BRIEF DESCRIPTION OF THE DRAWINGS

FIG. 4A is a plan view showing an exemplary structure of an optical device according to a third exemplary modification of the first embodiment;

FIG. 4B is a section view showing a structure of an emitting section of the optical device according to the third exemplary modification of the first embodiment;

FIG. 6A is a plan view showing an exemplary structure of an optical device according to a third embodiment of the invention;

FIG. 6B is a section view showing the exemplary structure of the optical device according to the third embodiment of the invention;

FIG. 8A is a plan view showing an exemplary structure of an optical device of the fourth embodiment in which the first reflector is inserted;

FIG. 8B is a plan view showing an exemplary structure of the optical device of the fourth embodiment in which the first reflector is pulled out;

DESCRIPTION OF THE PREFERRED EMBODIMENTS

Figure 1:
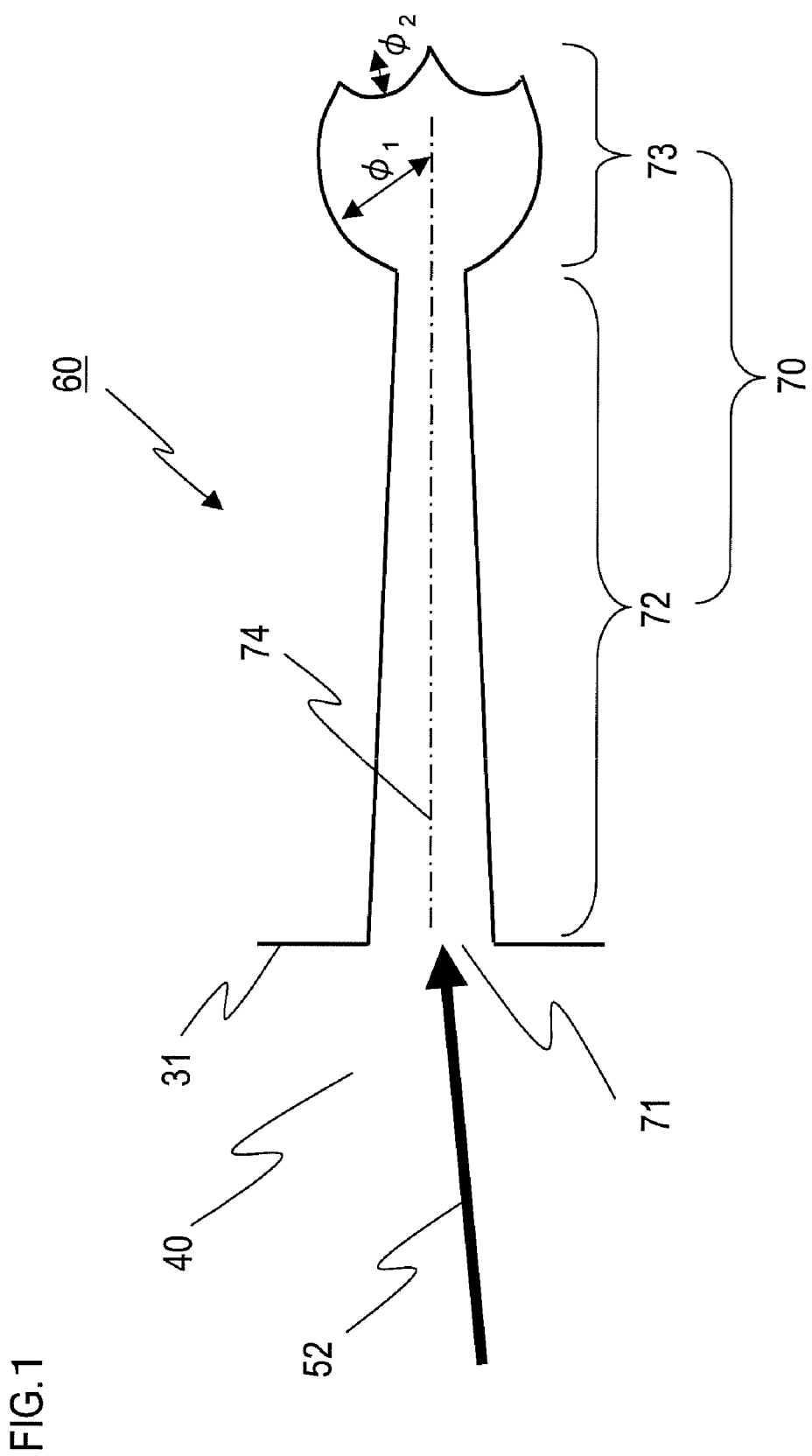
FIG. 1 is a plan view showing an exemplary structure of an optical device according to a first embodiment of the invention.

The invention will now be described based on preferred embodiments, which do not intend to limit the scope of the invention, but exemplify the invention.

Some optical devices are provided with a free space through which an optical beam propagates and elements such as a mirror and an optical filter disposed in an optical path within the space. When light reflected by surfaces of those elements is light not used (unwanted light) in such an optical device, unwanted scattered light is generated by a wall surface and end faces of optical fibers surrounding the free space. The scattered light causes noises by becoming as stray light and by propagating within the optical device or by coupling again with light output/input means of the light beam. When a light beam is irradiated out of a light output means directly to a surface having high reflectivity and when the reflected light is not used (unwanted light) in particular, the reflected light may become a serious cause of deterioration of the return loss characteristics when the reflected light returns to the light output means by being reflected by the wall surface and others.

Accordingly, the present invention discloses an arrangement of an optical device in which an antireflective means for removing the unwanted light is provided specifically at part of the wall surface to which such unwanted reflected light is intensively irradiated, at part of the wall surface that is considered to irradiate or reflect the light propagating as stray light, and on the optical path of the unwanted light. Thereby, the unwanted light irradiated to such part will not be reflected to the free space. That is, this arrangement prevents the stray light from propagating and entering the light output/input means. Specifically, this is effective for preventing the deterioration of the return loss characteristics.

As the antireflective means, it is conceivable to provide a means realized by (1) forming a terminal waveguide at an opening of the part of the wall surface to which the unwanted light is irradiated, (2) disposing a light-absorptive member at the part of the wall surface to which the unwanted light is irradiated or (3) tilting the part of the wall surface to which the unwanted light is irradiated to emit the unwanted light out of the optical device. Some embodiments for realizing these antireflective means will be explained below. It is noted that an overall structure of the optical device is not questioned here as far as the antireflective means of the invention can be applied, so that its concrete structure will not be shown here. In succession, embodiments using the structure of those embodiments to existing optical devices will be explained together with an exemplary overall structure of the optical device.

It is also noted that the free space here means a space where neither boundary condition nor significant refractive-index distribution exist and may be filled with refractive-index matching agent. Still more, the light output/input means may be various elements that emit or receive light such as a semiconductor chip and an optical modulator, beside the optical fibers and other light transmitting medium.

When the light output/input means are provided on the same level on the substrate, the light beam propagates within the free space in parallel with the substrate and the free space is surrounded by sidewall surfaces perpendicular to a plane of the substrate, the generated unwanted light is repeatedly reflected by the sidewall surfaces on the same level with the light output/input means. Therefore, the unwanted light couples again with the light output/input means over time, deteriorating the return loss or generating noises. Then, the antireflective means is provided at part including the level on which the light beam of the sidewall surface propagates in first through third embodiments. It is possible to prevent the unwanted light from repeatedly reflecting by providing the antireflective means in this manner.

First Embodiment

FIG. 1 shows an exemplary structure for forming a terminal waveguide 70 as an antireflective means 60 at part of a wall surface 31 to which unwanted light 52 is irradiated. Practically, there is not a wall surface to which unwanted light is irradiated, because there is a terminal waveguide. That is, "part of a wall surface to which unwanted light is irradiated" as described above is replaced with the terminal waveguide. And the part is on the optical path of the unwanted light 52. In this exemplary structure, the unwanted light 52 entering from an opening 71 is removed by transmitting through or by being absorbed by an inner wall surface of the terminal waveguide 70. Incident light remained at the time of transmission and absorption is also removed by repeating reflections.

The terminal waveguide 70 is composed of a tapered hollow section 72 and a terminal hollow section 73. The tapered hollow section 72 is a hollow extending straightly centering on a central axis 74 from one end of the opening 71 having a width of 115 µm for example while being tapered toward another end. An opening at the other end of the tapered hollow section 72 is 60 µm for example and is smaller than the opening 71. Preferably, the central axis 74 is slightly inclined, e.g., 10 degrees, with respect to an incident optical axis of the unwanted light 52. It is because the performance for preventing the reflection drops when there is no inclination at all. Accordingly, the tapered hollow section 72 may be formed by way of vertical etching for example. The terminal hollow section 73 is connected with the other end of the tapered hollow section 72 and has such a shape that an inner wall surface thereof has no tangential plane vertical to the central axis 74 of the tapered hollow section 72. Such shape includes a shape in which circular arcs whose diameters are $\phi_1=200$ µm and $\phi_2=100$ µm for example are combined. The unwanted light 52 entering the terminal waveguide 70 barely returns to the free space 40 even if it is reflected by the inner wall surface by forming the inner wall surface into the shape having no tangential plane vertical to the central axis 74. The unwanted light 52 attenuates and disappears over time while repeatedly being reflected by the inner wall surface of the terminal hollow section 73. A favorable effect may be obtained by using the inner wall surface whose reflectivity is 70% or less when light is vertically inputted in the case of treating the unwanted light by utilizing the hollow as described above. For example, reflectivity of a silicon material is about 30% when signal light having a wavelength of 1.5 µm is vertically inputted. It is noted that the hollow described in this specification needs not be always entirely covered by walls and an upper face thereof may be opened. Accordingly, the hollow may be suitably fabricated by etching vertically.

It is noted that the substantially same effect is brought about even if the terminal hollow section 73 is connected directly with the opening 71 in principle. However, it may not be preferable to connect the terminal hollow section 73 directly with the opening 71 from the following reason. That is, while a mechanical mask is often used in evaporating a high reflective material (Au) to a movable mirror of the optical switch and an opening diameter of the mechanical mask is normally around 600 µm, the reflective material is evaporated also to the inner wall of the terminal hollow section 73 if the terminal hollow section 73 is directly connected with the opening 71. In other words, there is a possibility that the unwanted light 52 is not removed by the transmission and absorption of the terminal hollow section 73 and is reflected to the free space 40. Therefore, the tapered hollow section 72 whose length is 600 µm for example is provided between the opening 71 and the terminal hollow section 73 in the invention so that Au is not evaporated on the inner wall surface of the terminal hollow section 73. From such a reason, however, it is also possible to shorten or to eliminate in some cases the length of the tapered hollow section 72 by considering a distance to which the reflective material possibly flies apart and evaporates.

As described above, the invention can prevent the stray light from being generated or being propagated by attenuating or eliminating the unwanted light. Then, because the invention can prevent the stray light from entering the light output/input means such as the optical fibers, the invention can realize the optical device whose optical noise is reduced and which excels in the return loss characteristics.

Beside the structure described above, the terminal waveguide 70 may be formed as described in the following exemplary modification.

<First Exemplary Modification>

Figure 2:
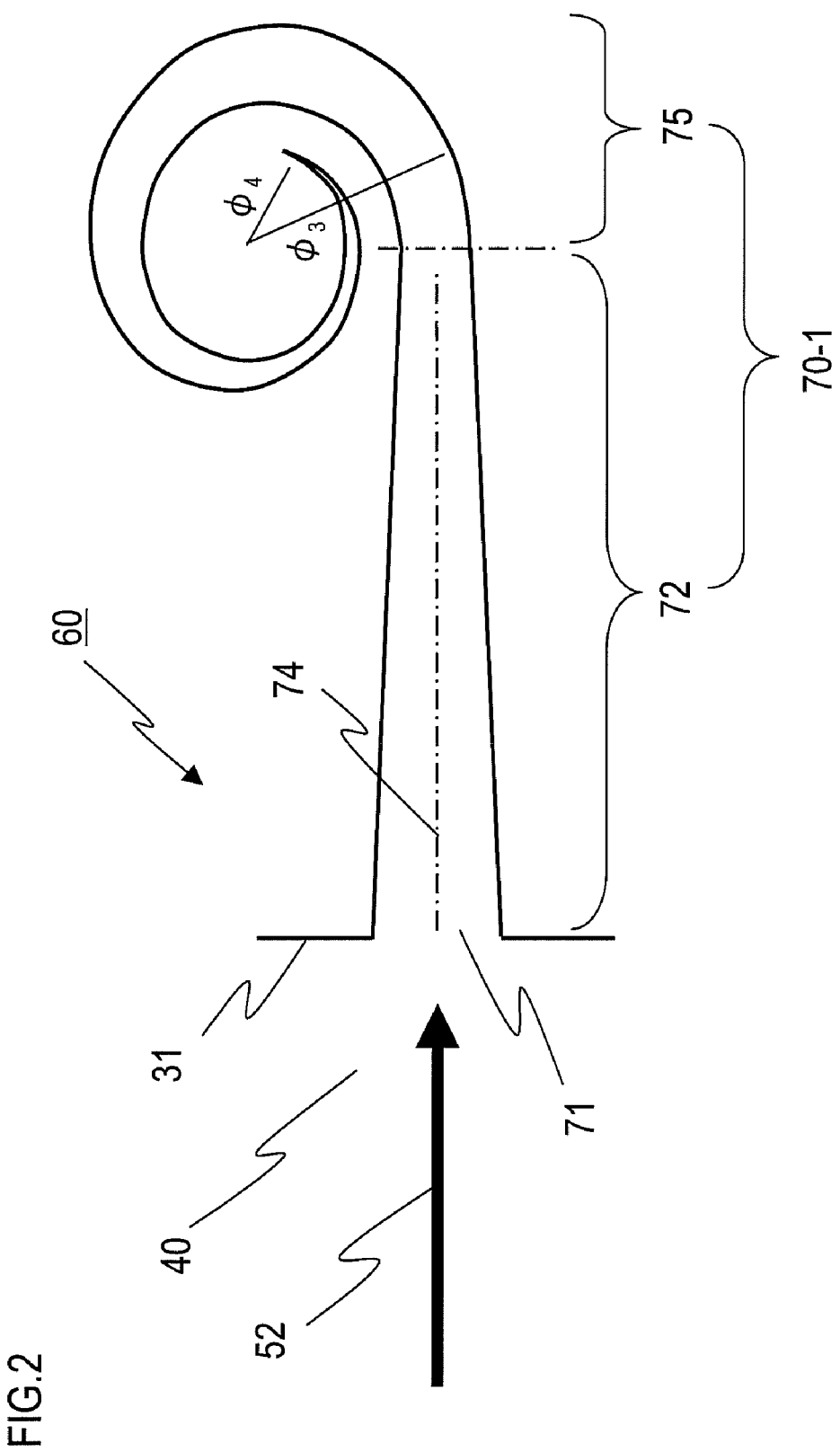
FIG. 2 is a plan view showing an exemplary structure of an optical device according to a first exemplary modification of the first embodiment.

FIG. 2 shows a first exemplary modification of the terminal waveguide. A terminal waveguide 70-1 is composed of a tapered hollow section 72 and a spiral tapered hollow section 75. The tapered hollow section 72 is a hollow that extends straightly centering on the central axis 74 from the opening 71 as one end while being tapered toward another end. The shape and the significance of existence of the tapered hollow section 72 are the same with that shown in FIG. 1. The spiral tapered hollow section 75 is a spiral hollow whose one end is connected with the other end of the tapered hollow section 72 and whose width is zeroed on 1.25 round from a periphery of $\phi_3=300$ µm to $\phi_4=150$ µm. The spiral tapered hollow section 75 is also tapered toward another end. It is possible to increase a number of times of reflection within the hollow and to effectively attenuate or eliminate the unwanted light 52 entering the terminal waveguide 70-1 by providing such spiral and tapered hallow at the end of the tapered hollow section 72.

<Second Exemplary Modification>

Figure 3:
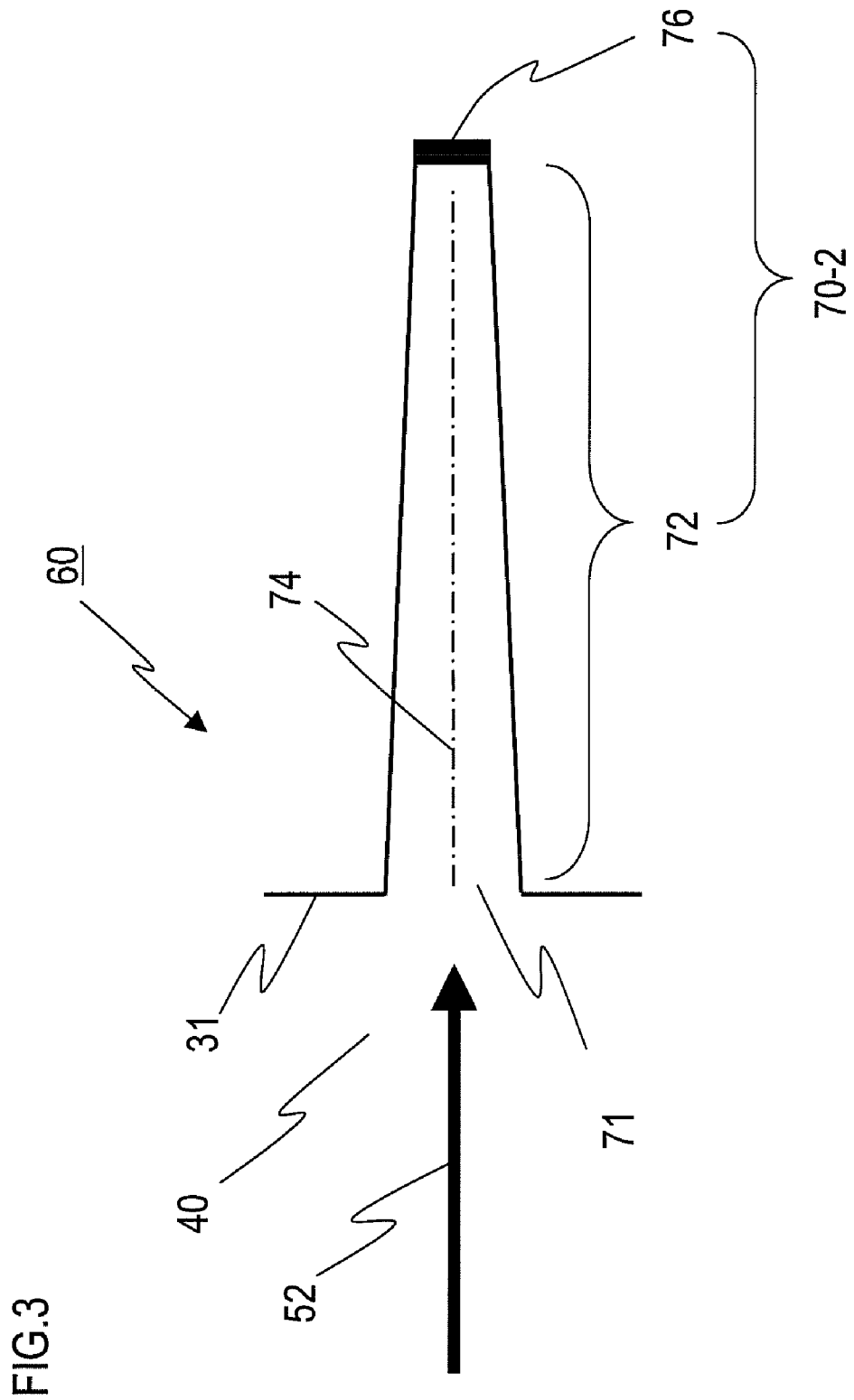
FIG. 3 is a plan view showing an exemplary structure of an optical device according to a second exemplary modification of the first embodiment.

FIG. 3 shows a second exemplary modification of the terminal waveguide. A terminal waveguide 70-2 is composed of the tapered hollow section 72 and a terminal section 76. The tapered hollow section 72 is a hollow extending straightly centering on the central axis 74 from the opening 71 as one end while being tapered toward another end. The shape and the significance of existence of the tapered hollow section 72 is the same with those of the FIG. 1. The terminal section 76 is a light absorptive member that is connected with the other end of the tapered hollow section 72 and is a black resin material dispersed with carbon for example. It is also possible to attenuate or eliminate the unwanted light 52 entering the terminal waveguide 70-2 by providing the light absorptive member as described above.

<Third Exemplary Modification>

FIG. 4 shows a third exemplary modification of the terminal waveguide. A terminal waveguide 70-3 is composed of the tapered hollow section 72 and an emitting section 77. FIG. 4A is a plan view of the terminal waveguide and FIG. 4B is a section view taken along a line A-A in FIG. 4A. The tapered hollow section 72 is a hollow extending straightly centering on the central axis 74 from the opening 71 as one end while being tapered toward another end. The shape and the significance of existence of the tapered hollow section 72 is the same with those of the FIG. 1. The emitting section 77 is provided with an emitting reflective surface 78 having a predetermined angle with respect to the unwanted light 52 and is connected to the other end of the tapered hollow section 72. The unwanted light 52 is reflected by the emitting reflective surface 78 and is emitted out of the optical device 2. When a substrate is a so-called (100) substrate having a plane of (100) plane of silicon mono-crystal and the unwanted light 52 enters the terminal waveguide 70 in parallel with the plane 32, the emitting reflective surface 78 may be formed by a (111) plane of the silicon mono-crystal substrate. When the emitting reflective plane is the (111) plane, an angle θ formed between the unwanted light 52 and a normal line of the emitting reflective surface 78 conforms to a crystal plane, so that the angle θ is 54.7°. Accordingly, the unwanted light 52 is reflected upward and is emitted out of the optical device 2. Thus, the unwanted light 52 may be emitted directly out of the optical device 2 by providing the emitting reflective plane at the end part. Specifically, it is possible to eliminate a possibility that the emitted light is reflected and is returned to the optical path even if some light reflecting plane that is parallel with the plane 32 exists on the outside of the optical device 2 by setting the emission angle not at a right angle with respect to the plane 32 as described above.

Second Embodiment

Figure 5:
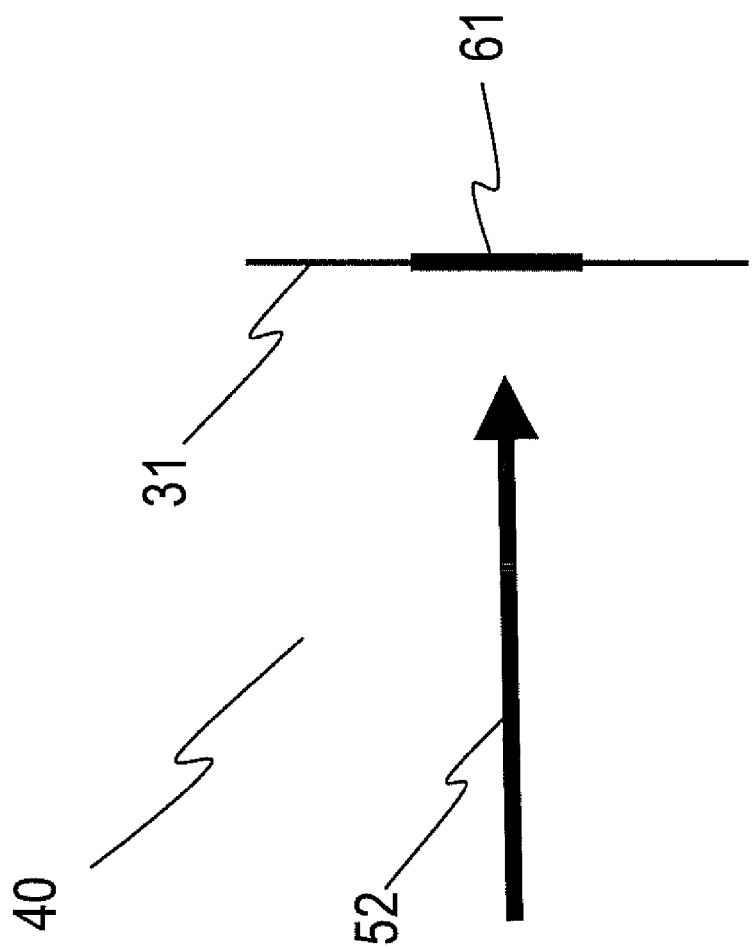
FIG. 5 is a plan view showing an exemplary structure of an optical device according to a second embodiment of the invention.

FIG. 5 shows an example in which a light absorptive member 61 is applied as the antireflective means 60 to the part of the wall surface 31 to which the unwanted light 52 is irradiated. A black resin material in which carbon is dispersed for example may be used as the light absorptive member 61 in the same manner with the third exemplary modification of the first embodiment. It is possible to attenuate the unwanted light 52 by a certain degree just by providing the light absorptive member 61 on the wall surface 31.

It is noted that preferably, the antireflective means 60 is provided on the part of the sidewall surface including the level where the light beam 50 propagates in forming the optical device on the substrate similarly to the first embodiment.

Third Embodiment

FIG. 6 shows a case when the part of the wall surface 31 to which the unwanted light 52 is irradiated is inclined. FIG. 6A is a plan view of the part of the wall surface 31 and FIG. 6B is a section view taken along a line A-A in FIG. 6A. An inclined sidewall surface 62 is formed by inclining the part of the wall surface 31 to which the unwanted light 52 is irradiated. The inclined sidewall surface 62 makes a predetermined angle with the unwanted light 52. The unwanted light 52 reflected by the inclined sidewall surface 62 is emitted directly out of the free space 40 with this angle. For instance, when the unwanted light 52 is incident on the inclined sidewall surface 62 in parallel with the plane 32 of the substrate, the angle θ formed between the unwanted light 52 and the inclined sidewall surface 62 is set at 54.7° in the same manner with the first embodiment described above by using the (111) plane of silicon. With this angle, the unwanted light 52 is emitted upward but not in the direction perpendicular to the plane 32 of the substrate. It is thus possible to emit the unwanted light 52 directly out of the free space 40 by providing the inclined sidewall surface 62 at the part to which the unwanted light 52 is irradiated.

Fourth Embodiment

While the various embodiments of the antireflective means 60 have been explained in the first through third embodiments, embodiments for applying this antireflective means 60 to existing optical devices will be explained in and after a fourth embodiment. The antireflective means 60 is disposed on the part of the wall surface to which light reflected by a light reflecting surface 80 always existing in or inserted into an optical path of the light beam 50 propagating within the free space 40 is directly irradiated also in the fourth embodiment and after. Practically, there is not a wall surface to which unwanted light is directly irradiated, because there is an antireflective means. That is, "the part of a wall surface to which light is irradiated" as described above is replaced with the antireflective means. The light reflecting surface may be one fixed and always existing within the optical path such as an interface of transparent medium of some part provided within the optical path and a surface of an optical filter that utilizes components of transmitted light or an interface of a light shielding plate and an optical part that are inserted into/pulled out of the optical path by being driven by an actuator. Or, the light reflecting surface may be a plane that always exists within the optical path after all because its position is located within the optical path even though it is driven and displaced.

Figure 7A:
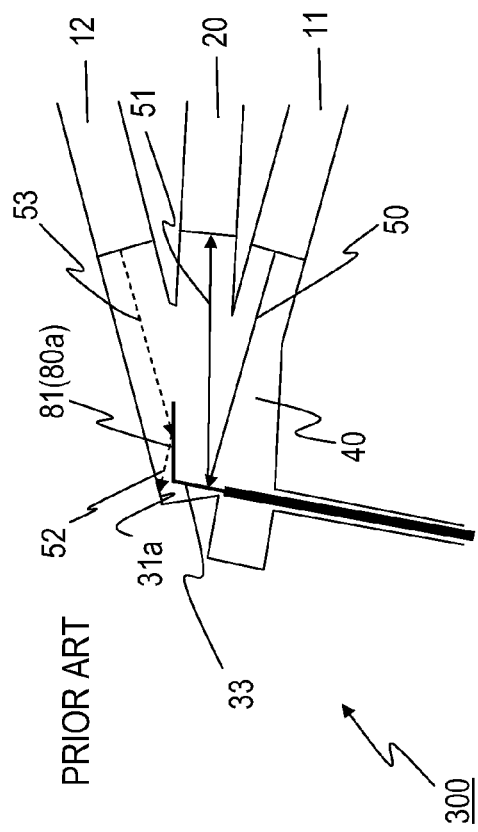
FIG. 7A is a plan view showing a structure of an optical device in which a first reflector is inserted to compare with a state of a fourth embodiment.
Figure 7B:
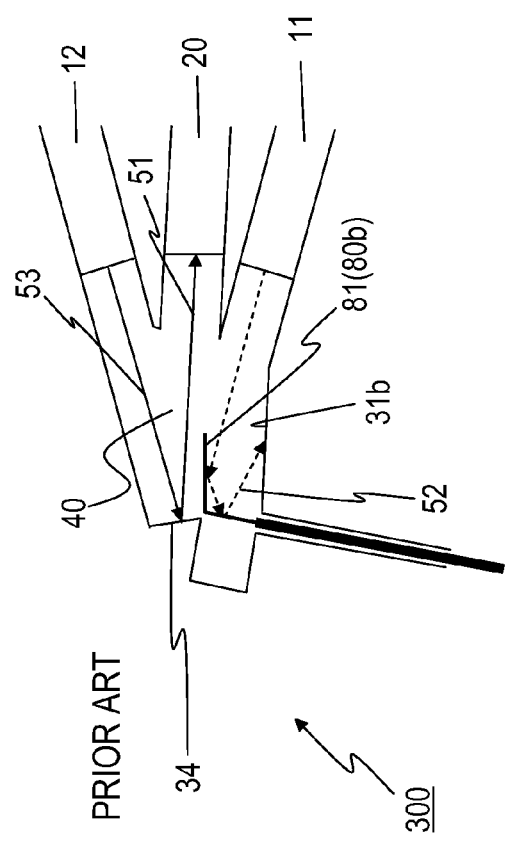
FIG. 7B is a plan view showing the structure of the optical device in which the first reflector is pulled out to compare with a state of the fourth embodiment.

According to the fourth embodiment of the invention, the antireflective means 60 is applied to an invention disclosed in Japanese Patent Application No. 2007-104564 filed by the applicant of the present invention. An optical device 300 of the invention disclosed in that application will be briefly explained with reference to FIGS. 7A and 7B. The optical device 300 has a free space 40, first and second light output means 11 and 12, a light input means 20, first and second reflectors 33 and 34 and a light shield 81. The first and second reflectors 33 and 34 have mirror surfaces, respectively. The light shield 81 is fixed to the first reflector 33 and has light reflecting surfaces 80a and 80b.

This device operates as follows in principle. The optical device 300 switches the relative position of the first reflector 33 with respect to the light input means 20 by driving the first reflector 33. That is, the optical device 300 can switch two states in which the first reflector 33 is positioned in first position (first disposition state) and the first reflector 33 is positioned in second position (second disposition state). In the first disposition state, a light beam 50 outputted out of the first light output means 11 is reflected by the mirror surface of the first reflector 33 and is inputted to the light input means 20 (see FIG. 7A). Meanwhile, a light beam 53 outputted out of the second light output means 12 is reflected by the light reflecting surface 80a of the light shield 81 and is irradiated to a wall surface 31a (see also FIG. 7A). In the second disposition state, the light beam 53 outputted out of the second light output means 12 is reflected by the mirror surface of the second reflector 34 and is inputted to the light input means 20 (see FIG. 7B). Meanwhile, the light beam 50 outputted out of the first light output means 11 is reflected by the light reflecting surface 80b (back of the light reflecting surface 80a) of the light shield 81 and is irradiated to a wall surface 31b (see also FIG. 7B).

The optical device 300 receives only the light beam from the first light output means 11 by the light input means 20 in the first disposition state and receives only the light beam from the second light output means 12 by the light input means 20 in the second disposition state by having the light shield 81. Accordingly, the optical device 300 can switch the light beams. However, the light beam from the second light output means 12 is reflected by the light shield 81 in the first disposition state and the light beam from the first light output means 11 is reflected by the light shield 81 in the second disposition state. Then, the unwanted light 52 reflected by the light shield 81 is reflected further by the wall surfaces 31a and 31b and is repeatedly reflected after that until disappearing from the free space 40. Therefore, the unwanted light 52 may enter the light output and input means of the optical fibers, i.e., the first and second light output means 11 and 12 in particular, as stray light and may deteriorate the return loss characteristics and others.

Then, the antireflective means 60 is applied to the part of the wall surface 31 where the unwanted light 52 reflected by the light shield 81 is irradiated as shown in FIGS. 8A and 8B. That is, the wall to which the unwanted light 52 is irradiated is replaced with the antireflective means 60. Thereby, it becomes possible to eliminate the unwanted light 52 from the free space 40 and to prevent any stray light from being generated. When the return loss amount of the prior art optical device 300 shown in FIGS. 7A and 7B was compared with that of the optical device 3 of the invention shown in FIGS. 8A and 8B, while the return loss amount of the first light output means 11 of the prior art optical device 300 was 10.2 dB, that of the optical device 3 of the invention was 43.0 dB. Further, while the return loss amount of the second light output means 12 of the prior art optical device 300 was 18.7 dB, that of the optical device 3 of the invention was 47.3 dB. Thus, the return loss characteristics of the respective light output means of the invention has been remarkably improved.

It is noted that although it is possible to obtain the effect of the invention basically at any part if the wall surface 31 to which the antireflective means 60 is applied is the part where the unwanted light 52 is irradiated, it is most effective to apply the antireflective means 60 to the part where the unwanted light 52 is (directly) irradiated at first after being reflected by the light shield 81. Still more, although FIGS. 8A and 8B show the structure of the optical device 3 in which the terminal waveguide 70 shown in FIG. 1 is applied as the antireflective means 60, the terminal waveguide 70 having the either structure shown in the first through third embodiments may be applied.

Fifth Embodiment

According to a fifth embodiment of the invention, the antireflective means 60 is applied to an invention disclosed in Japanese Patent Application No. 2006-155895 filed by the applicant of the present invention. An optical device 400 based on the invention disclosed in that application will be briefly explained with reference to FIGS. 9A and 9B. The optical device 400 is composed of a free space 40, a light output means 10, first and second light inputting means 21 and 22, a reflector 35 and a blocking section 82. The reflector 35 has a mirror surface and is driven so that it is inserted into and/or pulled out of predetermined switching position on an optical path of a light beam outputted out of the light output means 10. The blocking section 82 is fixed at a tip of the reflector 35. The blocking section 82 is made of a material that does not transmit the light beam 50 from the light output means 10. Among the light beam 50, the blocking section 82 reflects the light irradiated to the blocking section 82 and blocks the reflected light from reaching the first light inputting means 21.

Figures 9A, 9B:
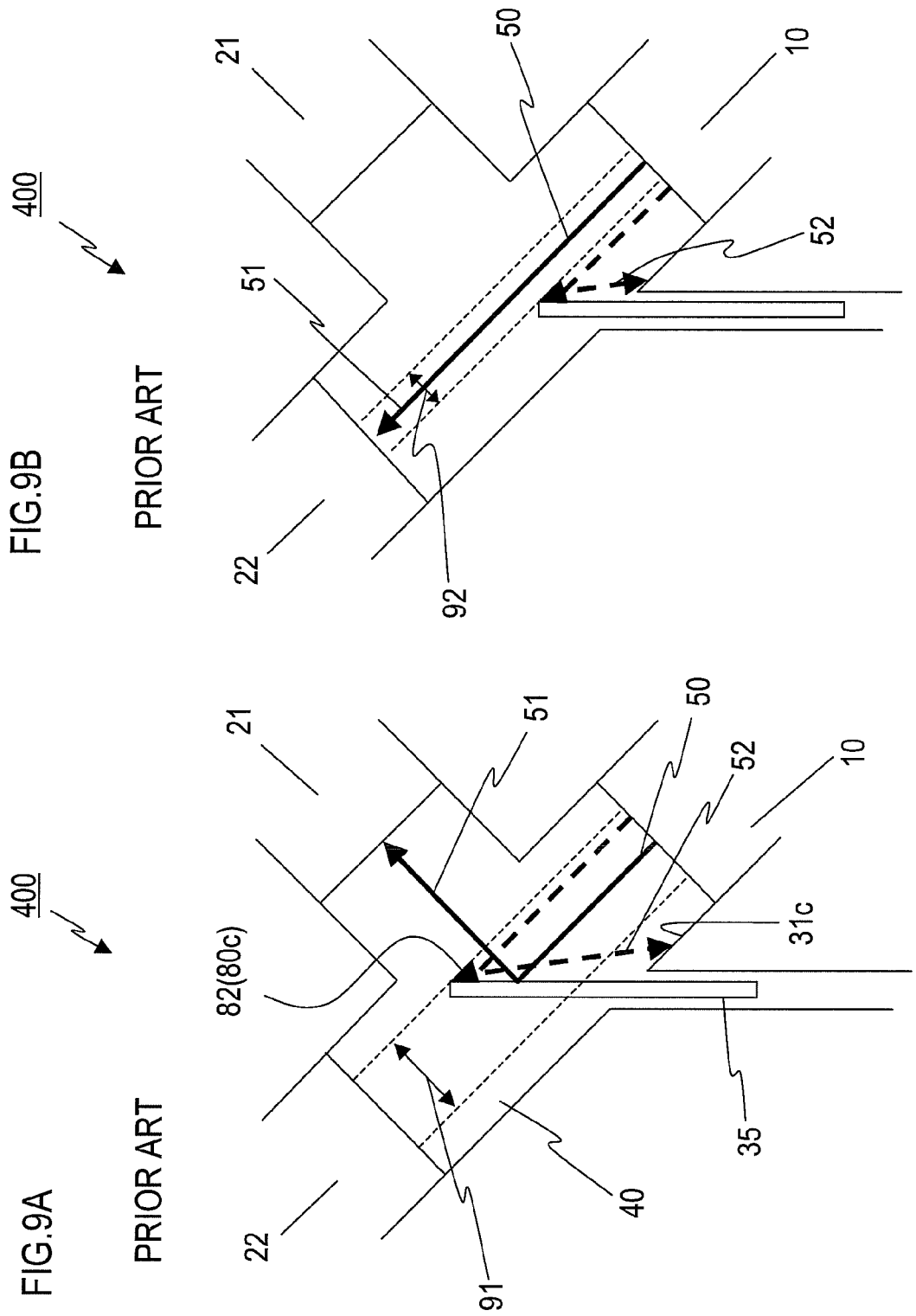
FIG. 9A is a plan view showing a structure of an optical device in which a first reflector is inserted to compare with a fifth embodiment
FIG. 9B is a plan view showing the structure of the optical device in which the first reflector is pulled out to compare with the fifth embodiment.

Next, a principle of operation of this device will be explained. The optical device 400 can switch a first state in which the reflector 35 is inserted into the predetermined switching position and a second state in which the reflector 35 is pulled out of the predetermined switching position by driving the reflector 35. In the first state, the light beam 50 outputted out of the light output means 10 is reflected by the mirror surface of the reflector 35 and enters the first light inputting means 21. Part of the light beam 50 is reflected by a light reflecting surface 80c of the blocking section 82 and is irradiated to a wall surface 31c as unwanted light. It is noted that if the part of the light beam 50 enters the second light inputting means 22, crosstalk characteristics of the optical device 400 deteriorates. Therefore, the reflector 35 must shield at least a crosstalk preventing least minimum area 91. In the second state, the light beam 50 outputted out of the light output means 10 is inputted to the second light inputting means 22 as shown in FIG. 9B. Part of the light is reflected by the light reflecting surface 80c of the blocking section 82 and is irradiated to the wall surface 31c as unwanted light. It is noted that the reflector 35 must enable the light beam 50 to pass at least a low-loss maintaining least minimum assured area 92 so that an insertion loss between the light output means 10 and the second light inputting means 22 is kept at a predetermined value or less.

The optical device 400 can keep the reflector 35 near the light beam 50 while preventing crosstalk to the first light inputting means 21 in the second state in particular by having the blocking section 82. That is, the blocking section 82 brings about an effect of reducing a driving stroke of the reflector 35 required for switching while maintaining the optical loss and crosstalk characteristics required to the optical device 400.

However, the light beam reflected by the blocking section 82 in the first state is irradiated to the wall surface 31c as unwanted light 52. The light beam reflected by the blocking section 82 in the second state is also irradiated to the wall surface 31c as unwanted light 52. Then, these unwanted lights 52 are reflected by the wall surface 31c and repeatedly reflect until disappearing from the free space 40. Therefore, the unwanted light 52 may enter the light output and input means of the optical fibers, i.e., the light output means 10 in particular, and may deteriorate the return loss characteristics and others.

Figure 10A:
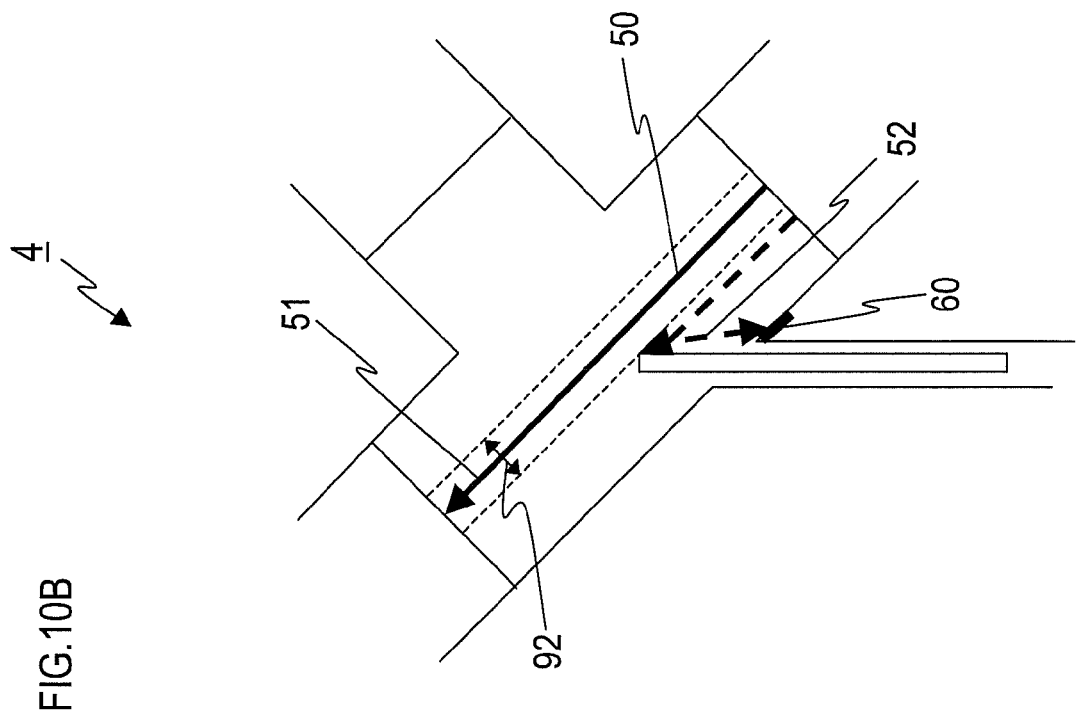
FIG. 10A is a plan view showing an exemplary structure of an optical device of the fifth embodiment in which the first reflector is inserted.
Figure 10B:
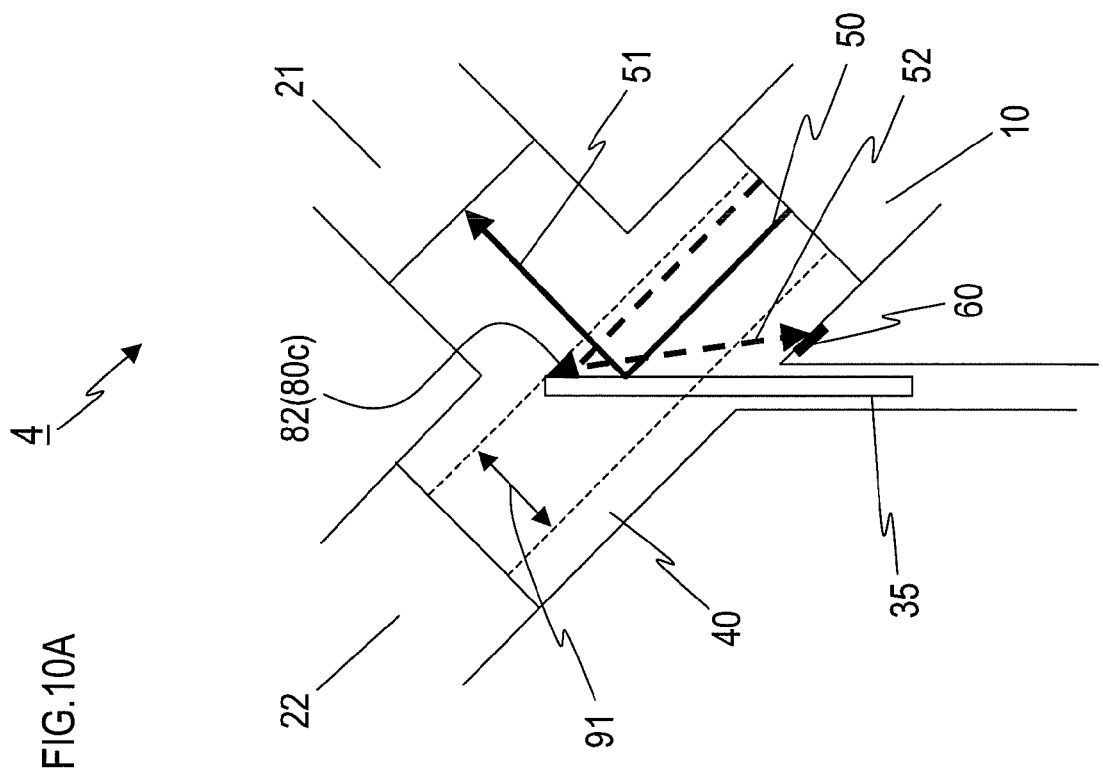
FIG. 10B is a plan view showing an exemplary structure of the optical device of the fifth embodiment in which the first reflector is pulled out.

Then, the antireflective means 60 is applied to part of the wall surface 31c to which the unwanted light 52 reflected by the blocking section 82 is irradiated as shown in FIGS. 10A and 10B. As a result, it becomes possible to eliminate the unwanted light 52 out of the free space 40 and to prevent stray light from being generated. It is noted that although it is possible to obtain the effect of the invention basically at any part if the wall surface 31 to which the antireflective means 60 is applied is the part where the unwanted light 52 is irradiated, it is most effective to apply the antireflective means 60 to the part where the unwanted light 52 is (directly) irradiated at first after being reflected by the blocking section 82. Still more, although FIGS. 10A and 10B show the structure of the optical device 4 in which the light absorptive member 61 shown in FIG. 5 is applied as the antireflective means 60, one having the either structure shown in the first through third embodiments may be applied.

Sixth Embodiment

Figure 11:
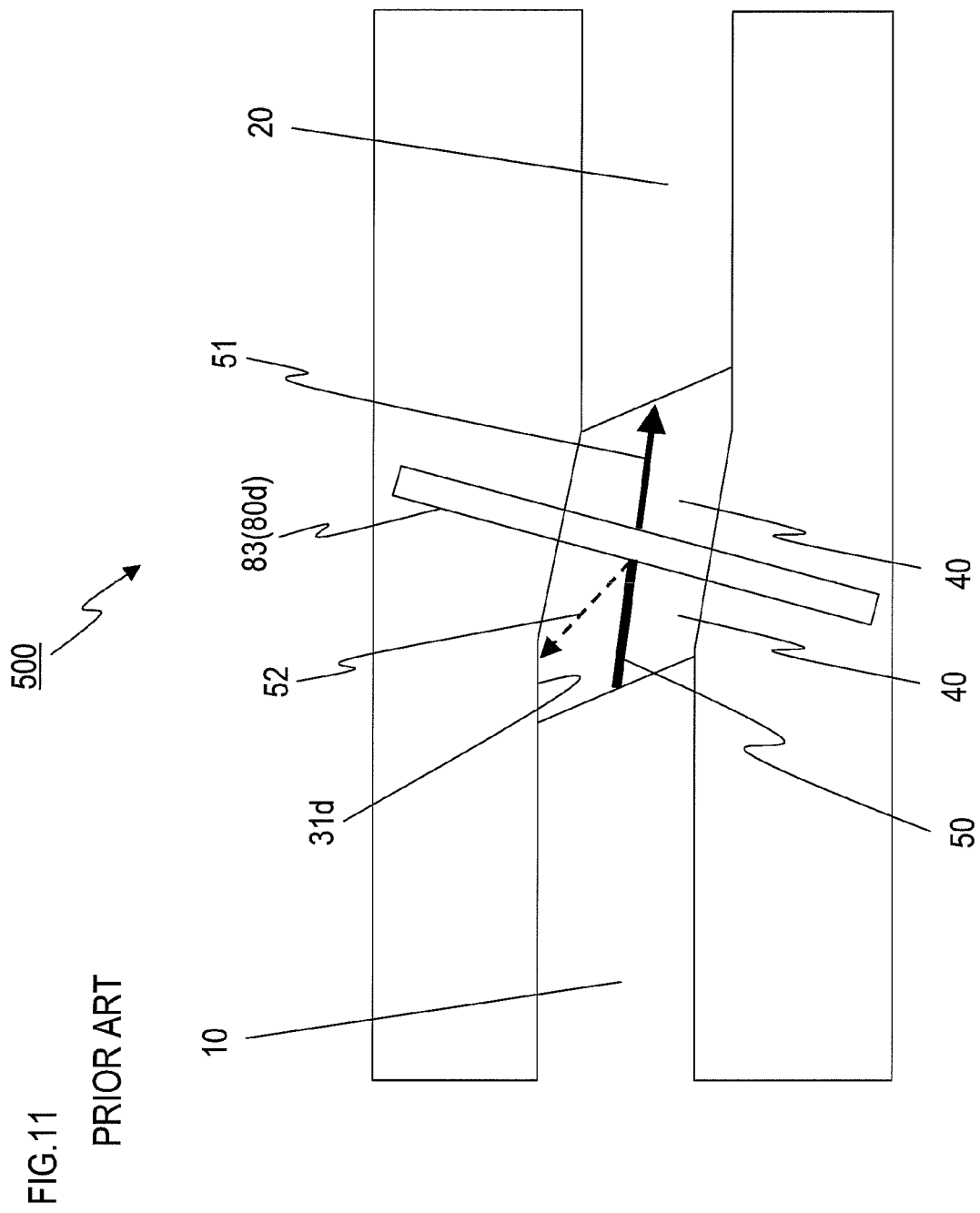
FIG. 11 is a plan view showing a structure of an optical device to compare with a sixth embodiment of the invention.
Figure 12:
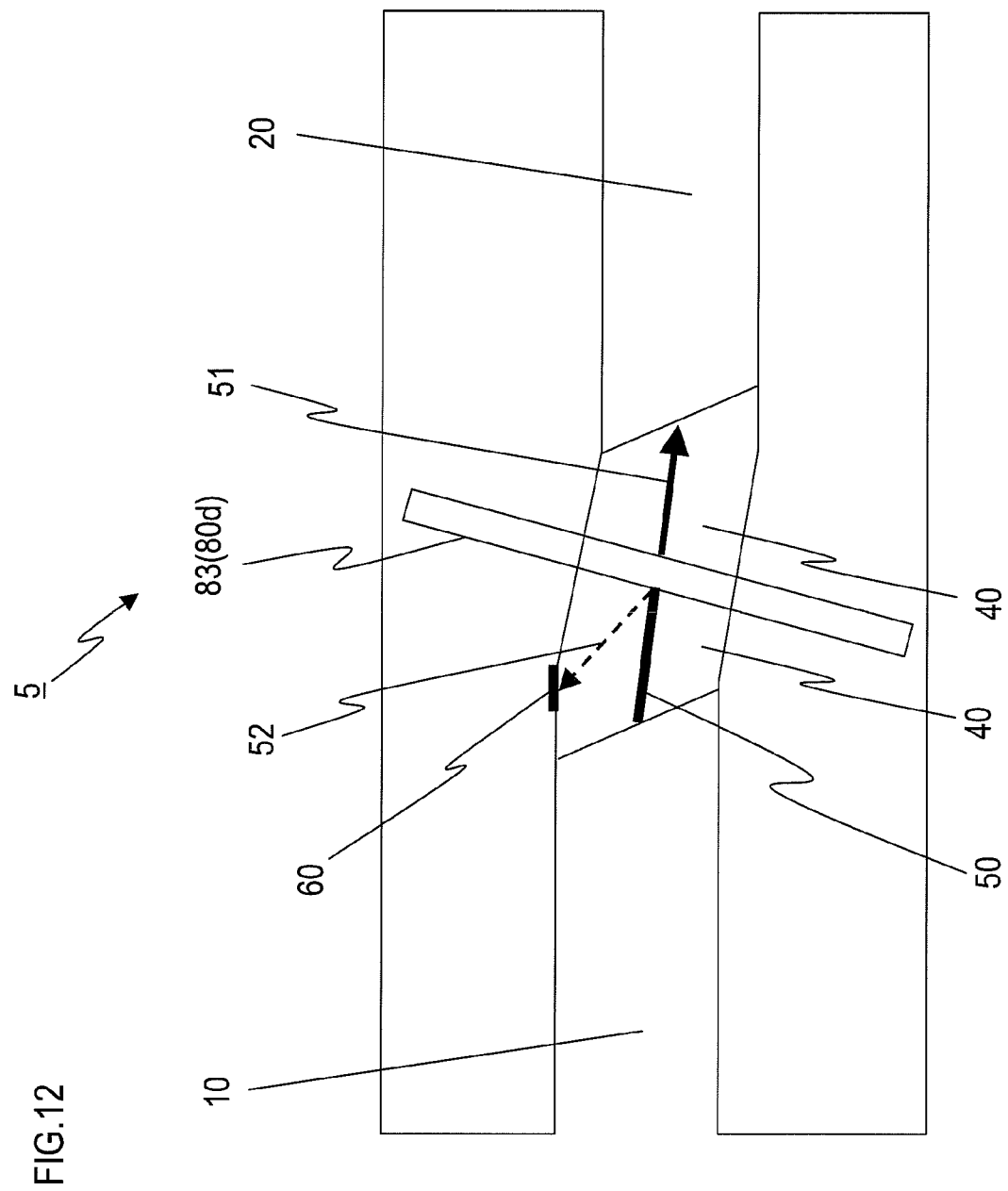
FIG. 12 is a plan view showing an exemplary structure of an optical device according to the sixth embodiment of the invention.

According to a sixth embodiment of the invention, the antireflective means 60 of the invention is applied to an existing optical device 500 into which an optical filter 83 is inserted between a light output and input means 10 and 20 as shown in FIG. 11. FIG. 12 shows a structure of an optical device 5 to which the antireflective means 60 is applied.

In the optical device 500, a large portion of a light beam 50 outputted out of the light output means 10 to the free space 40 transmits through the optical filter 83 and enters the light input means 20. However, part of the light beam 50 is reflected by the optical filter 83 and is irradiated to a wall surface 31d as unwanted light 52. In such a case, a surface of the optical filter 83 may be said to be functioning as a light reflecting surface 80d. Then, the unwanted light 52 irradiated to the wall surface 31d repeatedly reflects after that until disappearing from the free space 40. Therefore, the unwanted light 52 may enter the light output and input means of the optical fibers as stray light. The stray light entering the light output means 10 may deteriorate the return loss characteristics and others in particular.

Then, the antireflective means 60 is applied to part of the wall surface 31d to which the unwanted light 52 reflected by the optical filter 83 (light reflecting surface 80d) is irradiated as shown in FIG. 12. As a result, it becomes possible to eliminate the unwanted light 52 out of the free space 40 and to prevent stray light from being generated. It is noted that although it is possible to obtain the effect of the invention basically at any part if the wall surface 31 to which the antireflective means 60 is applied is the part where the unwanted light 52 is irradiated, it is most effective to apply the antireflective means 60 to the part where the unwanted light 52 is (directly) irradiated at first after being reflected by the optical filter 83 also in this case. Still more, although FIG. 12 shows the structure of the optical device 5 in which the light absorptive member 61 shown in FIG. 5 is applied as the antireflective means 60, one having the either structure shown in the first through third embodiments may be applied.

<Exemplary Modification>

Figure 13:
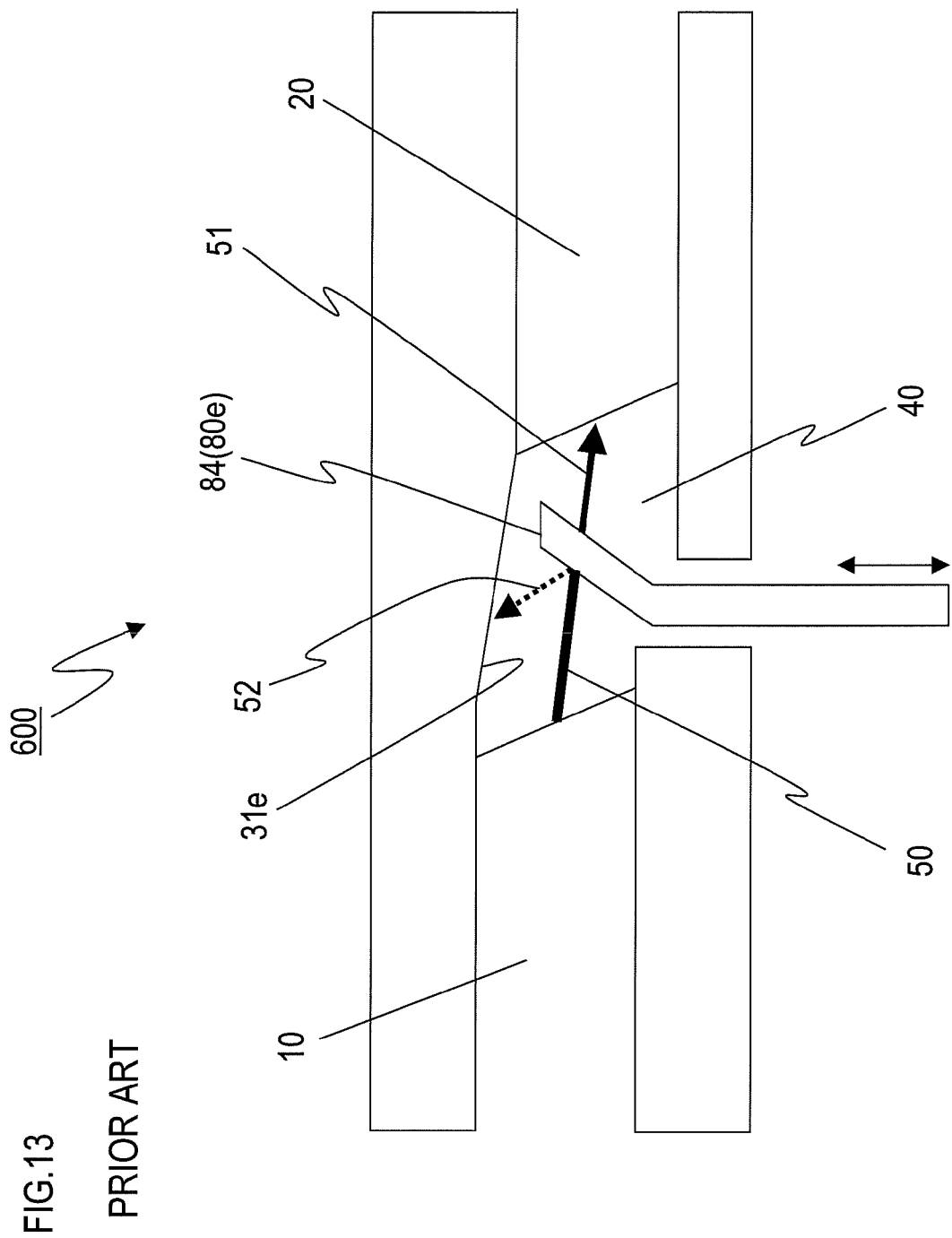
FIG. 13 is a plan view showing a structure of an optical device to compare with an exemplary modification of the sixth embodiment.
Figure 14:
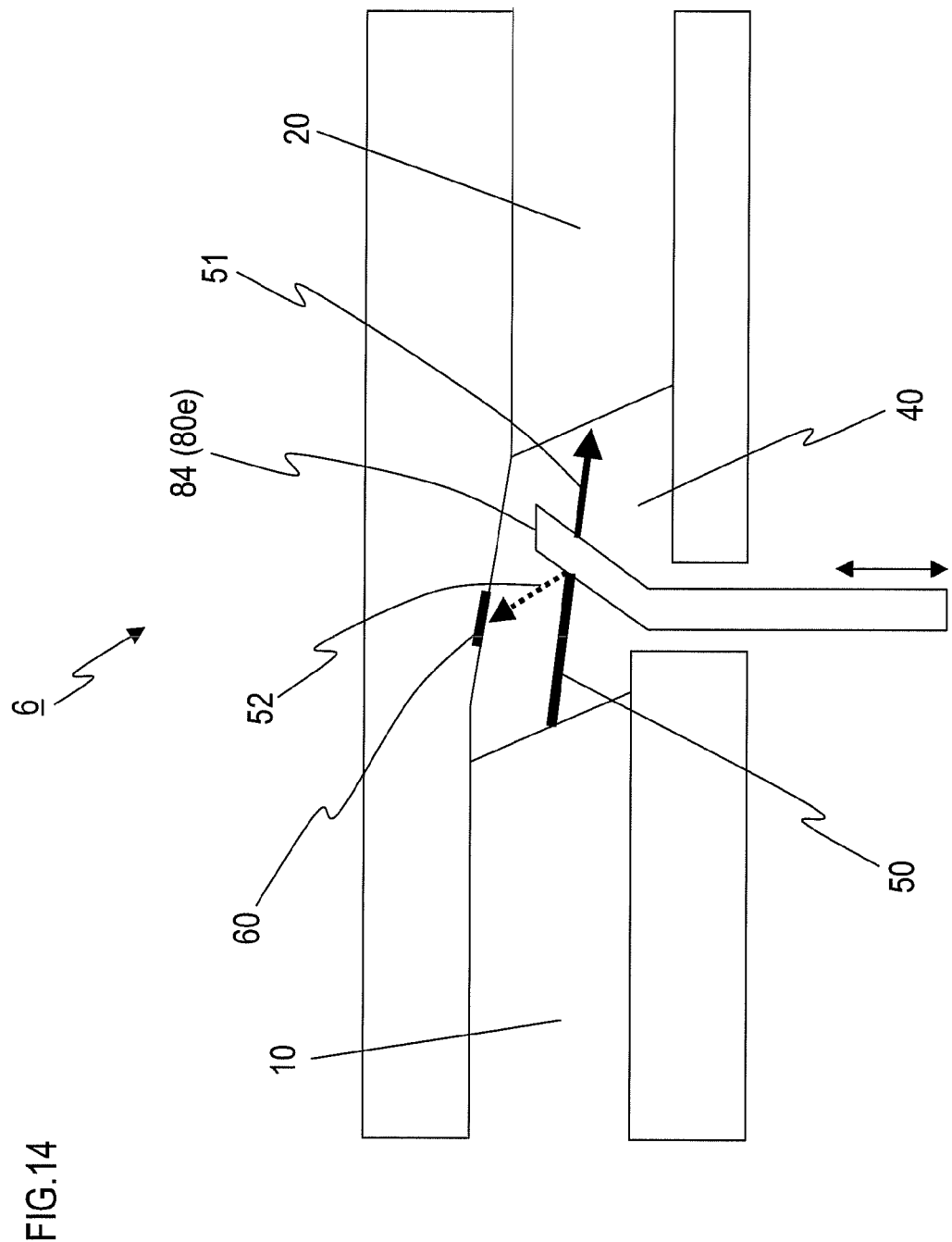
FIG. 14 is a plan view showing an exemplary structure of an optical device according to the exemplary modification of the sixth embodiment.

The invention may be applied also to an existing optical device 600 into which a light shielding driver 84 as shown in FIG. 13 is inserted instead of the optical filter 83 inserted in the free space 40 between the light output and input means 10 and 20. FIG. 14 shows an optical device 6 to which the antireflective means 60 of the invention is applied. It is possible to prevent stray light from being generated also in the optical device 6 in the same manner with the case of the optical filter 83 by arranging as described above. Here, the light shielding driver means an ON and OFF-type optical switch that is driven, i.e., is inserted into and/or pulled out, in a two-valued manner and a variable light attenuator that is driven, i.e., is inserted into and/or pulled out, in a multi-valued manner (including continuous). It is noted that although it is possible to obtain the effect of the invention basically at any part if the wall surface to which the antireflective means 60 is applied is the part where the unwanted light 52 is irradiated, it is most effective to apply the antireflective means 60 to the part where the unwanted light 52 is (directly) irradiated at first after being reflected by the light shielding driver 84 (light reflecting face 80e) also in this case. Still more, although FIG. 14 shows the structure of the optical device 6 in which the light absorptive member 61 shown in FIG. 5 is applied as the antireflective means 60, one having the either structure shown in the first through third embodiments may be applied.

[Fabrication Method]

Preferably, the optical device of the invention is fabricated by way of Deep-RIE (Reactive Ion Etching) on a SOI substrate similarly to items disclosed in JP2005-37885A and JP2005-37885A. It is noted that the invention may be most usefully applied to an optical device connected with an optical element sensitive to reflection.

What is claimed is:

1. An optical device comprising:
   a free space at least having a wall surface at part thereof;
   one or more light output sections that output a light beam toward the free space;
   one or more light input sections that input the light beam arriving through the free space; and
   a terminal waveguide provided at either part of an optical path of unwanted light which is output from the light output sections and is shielded in the free space in order to prevent the unwanted light from being reflected repeatedly in the free space,
   wherein the terminal waveguide comprises a tapered hollow section having an opening as one end and is tapered to another end; and
   the unwanted light entering from the opening is removed by repeatedly being reflected in an inner wall surface of the terminal waveguide while being transmitted and absorbed.

2. The optical device according to claim 1, wherein the terminal waveguide comprises:
   a terminal hollow section connected with the other end of the tapered hollow section and having an inner wall surface having no tangential plane perpendicular to a central axis of the tapered hollow section.

3. The optical device according to claim 1, wherein the terminal hollow section is tapered in spiral toward another end.

4. The optical device according to claim 1, wherein the terminal waveguide comprises:
   a terminal section connected with the other end of the tapered hollow section and having a light absorptive member.

5. The optical device according to claim 1, wherein the terminal waveguide comprises:
   an emitting section connected with the other end of the tapered hollow section and having an emitting reflective plane formed so that the unwanted light is reflected and is directly emitted out of the optical device.

6. The optical device according to claim 1, wherein a light reflecting surface is always inserted or is driven so as to be inserted into an optical path of a light beam propagating within the free space; and
   the terminal waveguide is provided at the part where reflected light reflected by the inserted light-reflecting surface is directly irradiated.

7. The optical device according to claim 1, wherein the light output sections include a first light output section and a second light output section, and wherein the optical device further comprises:
   first and second reflectors having mirror surfaces; and
   a light shield fixed to the first reflector and having the light reflecting surface;
   the optical device having a first disposition state in which a relative position of the first reflector with respect to the light input sections is disposed at a first position or a second disposition state in which the relative position is disposed at a second position by driving the first reflector;
   the optical beam outputted out of the first light output section is inputted to the light input sections by being reflected by the mirror surface of the first reflector and a light beam outputted out of the second light output section is irradiated to the terminal waveguide by being reflected by the light reflecting surface of the light shield in the first disposition state; and
   the light beam outputted out of the second light output section is inputted to the light input sections after being reflected by the mirror surface of the second reflector and the light beam outputted out of the first light output section is irradiated to the terminal waveguide by being reflected by the light reflecting surface of the light shield in the second disposition state.

8. The optical device according to claim 1, wherein the light input sections include a first light input section and a second light input section, and wherein the optical device further comprises:
   a reflector having a mirror surface and driven so as to be inserted into or pulled out of predetermined switching position on an optical path of a light beam outputted out of the light output sections; and
   a blocking section having a light reflecting surface that is fixed at a tip of the reflector, does not transmit the light beam outputted out of the light output sections and blocks the light beam outputted out of the light output sections from reaching the first light input section;
   the optical device having a first state in which the reflector is inserted into the predetermined switching position or a second state in which the reflector is pulled out of the predetermined switching position by driving the reflector;

the optical beam outputted out of the light output sections is inputted to the first light input section by being reflected by the mirror surface of the reflector and part of the light beam is irradiated to the terminal waveguide by being reflected by the light reflecting surface of the blocking section in the first state; and the light beam outputted out of the light output sections is inputted to the second light input section and part of the light beam is irradiated to the terminal waveguide by being reflected by the light reflecting surface of the blocking section in the second state.

9. The optical device according to claim 6, wherein the light reflecting surface is a surface of an optical filter always inserted into an optical path of light propagating within the free space.

10. The optical device according to claim 6, wherein the light reflecting surface is a surface of a light shield driver inserted into an optical path of light propagating within the free space by being driven and displaced in a two-valued or multi-valued manner.

* * * * *